(12) United States Patent
Maeshima

(10) Patent No.: US 7,922,271 B2
(45) Date of Patent: Apr. 12, 2011

(54) LABEL PRINTER

(75) Inventor: Hidetoshi Maeshima, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 595 days.

(21) Appl. No.: 11/994,033

(22) PCT Filed: Jun. 5, 2006

(86) PCT No.: PCT/JP2006/311247
§ 371 (c)(1),
(2), (4) Date: Dec. 27, 2007

(87) PCT Pub. No.: WO2007/000875
PCT Pub. Date: Jan. 4, 2007

(65) Prior Publication Data
US 2009/0086004 A1  Apr. 2, 2009

(30) Foreign Application Priority Data

Jun. 29, 2005  (JP) ................................ 2005-189510

(51) Int. Cl.
*B41J 3/00* (2006.01)
(52) U.S. Cl. .......................................... 347/2; 358/1.18
(58) Field of Classification Search ................. 358/1.18, 358/3.24; 347/2
See application file for complete search history.

(56) References Cited

U.S. PATENT DOCUMENTS

| 6,771,297 | B2 * | 8/2004 | Bronson | 347/224 |
| 7,092,320 | B1 * | 8/2006 | Lee et al. | 369/30.32 |
| 2004/0230558 | A1 | 11/2004 | Tokunaka | |
| 2005/0027756 | A1 * | 2/2005 | Pettigrew | 707/204 |

FOREIGN PATENT DOCUMENTS

| JP | 2002-118740 | 4/2002 |
| JP | 2002-372755 | 12/2002 |
| JP | 2003-80766 | 3/2003 |
| JP | 2003-257153 | 9/2003 |
| JP | 2004-280928 | 10/2004 |
| WO | 2004/109696 | 12/2004 |

OTHER PUBLICATIONS

Machine Translation and Abstract of Japanese Patent Publication No. 2003-080766 published Mar. 19, 2003, 45 pages.
English Translation of PCT International Publication No. WO 2004/109696 published Dec. 16, 2004, 30 pages.

* cited by examiner

*Primary Examiner* — Julian D Huffman
(74) *Attorney, Agent, or Firm* — Nixon & Vanderhye P.C.

(57) ABSTRACT

A user's operation burden can be reduced by giving the data recording command and the label printing command by the use of only an interface for writing data to a recording medium. A label printer includes an extraction portion extracting label information from a recording medium image file which stores data to be written to a recording surface of a recording medium and label information to be printed on a label surface of the recording medium. A label information printing portion prints the extracted label information on the label surface of the recording medium. A file writing portion writes the recording medium image file to the recording surface of the recording medium.

6 Claims, 10 Drawing Sheets

LABEL PRINTER

This application is the U.S. national phase of International Application No. PCT/JP2006/311247 filed 5 Jun. 2006 which designated the U.S. and claims priority to Japanese Patent Application No. 2005-189510 filed 29 Jun. 2005, the entire contents of each of which are hereby incorporated by reference.

TECHNICAL FIELD

The present invention relates to a label printer.

BACKGROUND

Label printers have been widely used which print self-prepared label information (title, reference number, date, image, etc.) on a label surface of a rewritable recording medium such as a CD-R, a CD-RW, a DVD-R and a DVD-RW.

In the past, when the label information was printed and data was written on and to the recording medium by the use of computers, writing of data to a recording surface of the recording medium and printing of the label information on the label surface of the recording medium were performed in accordance with different commands, respectively.

It is troublesome for a users however, to separately provide a data writing command and a label printing command to a label printer by the use of a computer.

SUMMARY

An object of the described embodiments is to reduce a user's operation burden by providing the data recording command and the label printing command by the use of only an interface for writing data.

The described embodiments are contrived to achieve the above-mentioned object. That is, the described embodiments provide a label printer including an extraction portion extracting label information from a recording medium image file which stores data to be written to a recording surface of a recording medium and label information to be printed on a label surface of the recording medium; a label information printing portion printing the extracted label information on the label surface of the recording medium; and a file writing portion writing the recording medium image file to the recording surface of the recording medium.

According to the configuration, the label printer acquiring the recording medium image file storing the data and the label information extracts the label information from the recording medium image file, and the label information printing portion prints the label information on the label surface of the recording medium. The file writing portion writes the recording medium image file to the recording surface of the recording medium. That is, a user prepares the recording medium image file storing the data and the label information, and transmits the recording medium image file to the label printer so as to perform printing of the label information and writing of the recording medium image file on and to the recording medium.

Accordingly, since the user can perform writing of data and printing of the label information by the use of only one command, the operation is made easier.

DETAILED DESCRIPTION

Hereinafter, constituent members of the invention will be described.

(Recording Medium Image File)

A recording medium image file is information written to a recording surface of a recording medium (for example, a CD-R, a CD-RW, a DVD-R, a DVD-RW, etc.).

Figure 1A:
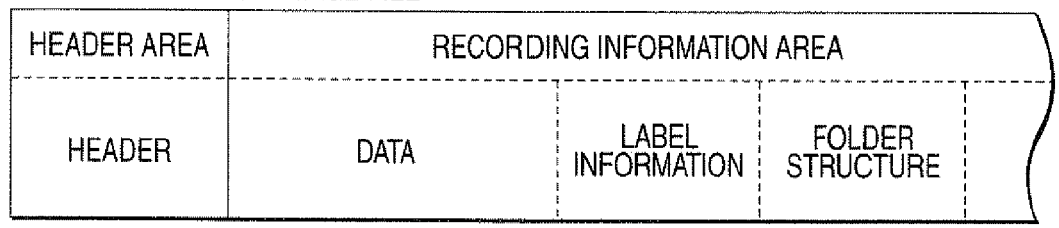
FIG. 1 is a diagram showing a data configuration (A) of a recording medium image file and a folder structure (B) thereof.

FIG. 1(A) shows a data configuration of the recording medium image file. The data of the recording medium image file is constituted by a header area storing a header having information such as a preparer, a preparation date, a data type, a data size, and the like and a recording information area. The recording information area is an area storing a content written to the recording surface of the recording medium. A file and a folder structure are stored in the recording information area. The type of the stored file is not particularly limited. The stored file may include data (text data, and image data) and label information, for example.

Figure 1B:
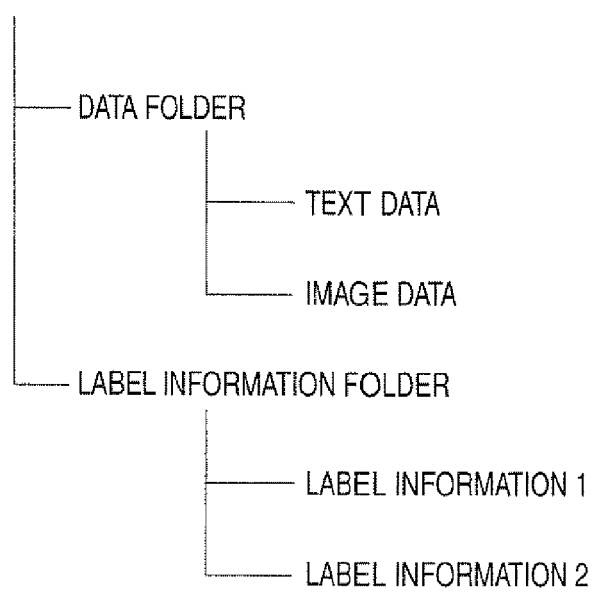

FIG. 1(B) is a diagram showing a folder structure when the data and the label information are stored. The data (text data and the image data) is stored in a data folder, and the label information is stored in a label information folder.

The recording medium image file can be prepared by the use of general recording medium writing software. When the recording medium image file is prepared by the use of the recording medium writing software, the user designates a file (data or label information) that the user wishes to store. Next, the recording medium writing software reads out the information and stores the readout information in the recording information storing area of the recording medium image file. The recording medium writing software adds a predetermined header to the header area again and prepares the recording medium image file. As described above, the recording medium image file including the label information is prepared by the use of the general recording medium writing software, and a label printing operation starts from the recording medium image file. Accordingly, the user can perform the label printing operation in a simple manner.

(Label Information)

The label information is information including predetermined titles, images and reference numbers. The label information is printed on the label surface of the recording medium and is used as information specifying a content of the recording medium. The label information can be prepared by the use of general label preparing software.

The configuration of the label information is not particularly limited, but the label information may include only image information such as a bitmap. The label information may include layout information and contents information (for example, text information and image information). The layout information is information specifying formats such as a coordinate, a size, a color, a font, and a slope. As a result, it is possible to change the label information in an easy manner merely by changing the contents information when the layout information is determined.

Recording medium preparing information may be used as the contents information instead of the text information and the image information. The recording medium preparing information is data-specific information. The recording medium preparing information includes information such as a recording date and time, a target folder, a JOB number, and a disc ID of corresponding data.

A file format of the label information is not particularly limited. The file format of the label information may include XML, JPEG, and the bitmap, for example.

In the label information, data designating information may be used instead of or in addition to the contents information. The data designating information allows the content of a file other than a file storing the label information to be used as the contents information by designating the file other than the file storing label information.

(Label Printer)

The label printer includes an extraction portion receiving the recording medium image file and extracting the label information, a label information printing portion printing the extracted label information on the label surface of the recording medium, and a file writing portion writing the recording medium image file to the recording surface of the recording medium. The label printer is connected to a file forming device preparing the recording medium image file using a network, thereby receiving the recording medium image file.

The extraction portion extracts the label information from the recording medium image file. In a method of extracting the label information, a specific file name, folder name, or extension is designated and extracted from the recording medium image file. For example, a file having a file name of "Label.bmp" is designated and extracted from files stored in the recording information area of the recording medium image file. The extracted label information is transmitted to the label information printing portion. The label information printing portion prints the label information on the label surface of the recording medium on the basis of the label information. A method of printing the label information on the label surface of the recording medium is not particularly limited, but it may include an ink-jet method and a sublimation method, for example.

The file writing portion writes the recording medium image file transmitted from the extraction portion to the recording surface of the recording medium. A method of writing the recording medium image file to the recording surface of the recording medium is not particularly limited. For example, in a one-time writable CD-R, the recording surface of the CD-R is coated with an organic dye, which is degenerated by a laser beam so as to record data. In a repetitively writable/rewritable CD-RW, the recording surface of the CD-RW employs a phase-change recording material. A change in power of the laser beam radiated on the recording surface causes the phase-change recording material to be in a crystalline state or a noncrystalline state. Since a light reflectance is different in the crystalline state and the noncrystalline state, the data is erased and recorded by the use of the different light reflectance. The recording medium image file written to the recording surface of the recording medium includes the label information in addition to the data, but since extra data is not written, the recording medium image file from which the label information is erased may be written to the recording surface of the recording medium.

The order of printing of the label information on the label surface of the recording medium and writing of data to the recording surface of the recording medium is not particularly limited. For example, after the label information is printed on the label surface, the data may be written to the recording surface, or printing of the label information and writing of data may be simultaneously performed.

Hereinafter, the label printing operation performed by the use of the constituent members will be schematically described.

Figure 2:
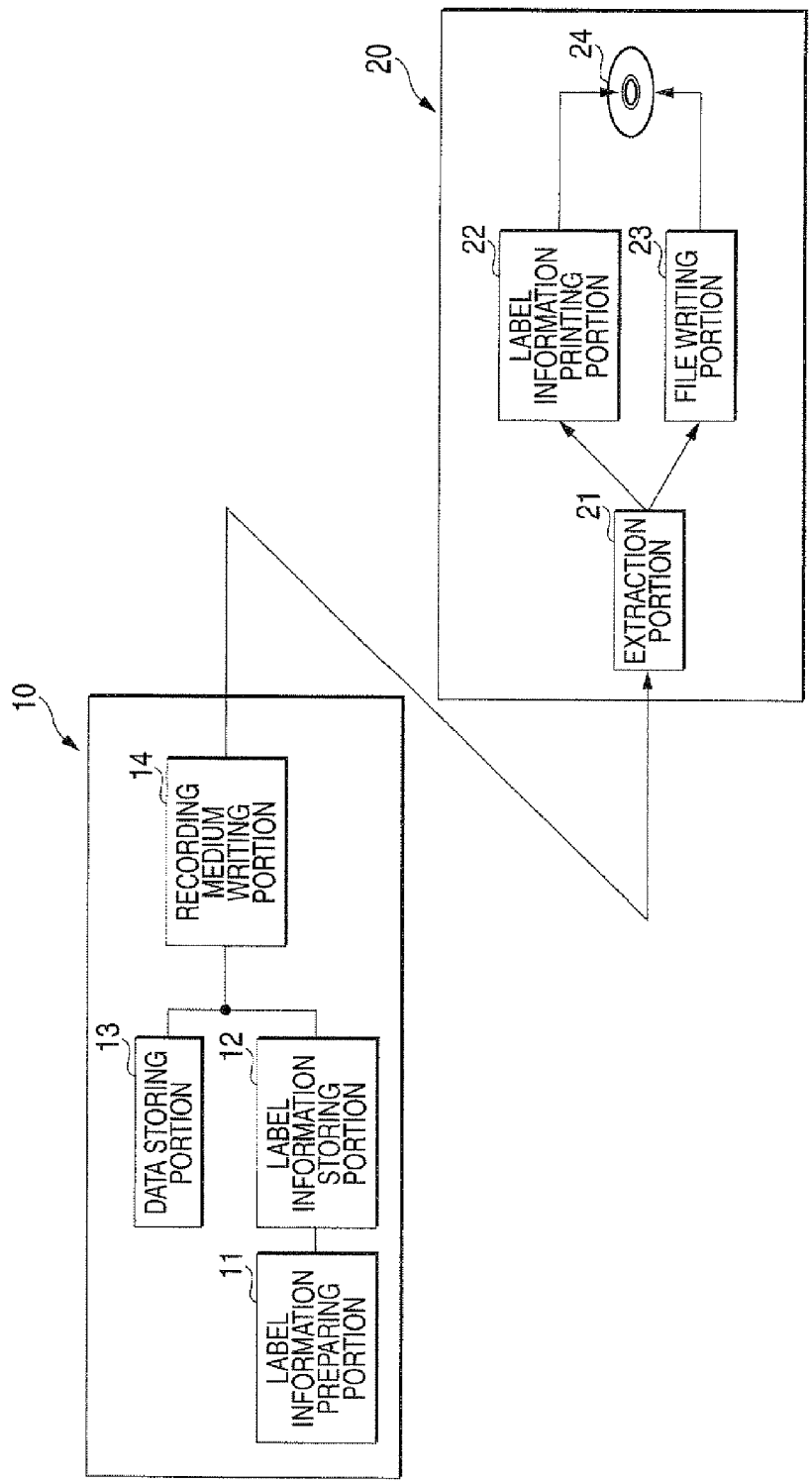
FIG. 2 is a block diagram showing a process of printing label information.

FIG. 2 is a block diagram showing a process of printing the label information in the recording medium. FIG. 2 shows a file forming device 10 preparing the recording medium image file, and a label printer 20 extracting the label information from the recording medium image file and printing the extracted label information in the recording medium.

The file forming device 10 includes a label information preparing portion 11, a label information storing portion 12, a data storing portion 13 and a recording medium writing portion 14. The label printer 20 includes an extraction portion 21, a label information printing portion 22, and a file writing portion 23. The file forming device 10 and the label printer 20 are in a communicable state using the network.

The label information preparing portion 11 prepares the label information printed on the label surface of the recording medium. The label information prepared by the label information preparing portion 11 is stored in the label information storing portion 12. The data (data such as text data or image data) to be written to the recording surface of the recording medium is stored in the data storing portion 13. The recording medium writing portion 14 reads out the label information and the data stored in the label information storing portion 12 and the data storing portion 13, and prepares the recording medium image file. The prepared recording medium image file is transmitted to the label printer 20.

In the label printer 20 acquiring the recording medium image file, the extraction portion 21 extracts the label information by designating a specific file name from the recording medium image file. The extracted label information is transmitted to the label information printing portion 22, which prints the label information on the recording medium. The extraction portion 21 transmits the recording medium image file to the file writing portion 23, which writes the recording medium image file to the recording surface of the recording medium 24.

As described above, the user can perform label printing and writing of the recording medium image file in a simple manner only by performing a writing operation of the file forming device 10.

Embodiment 1

Hereinafter, an embodiment of the invention will be described.

Figure 3:
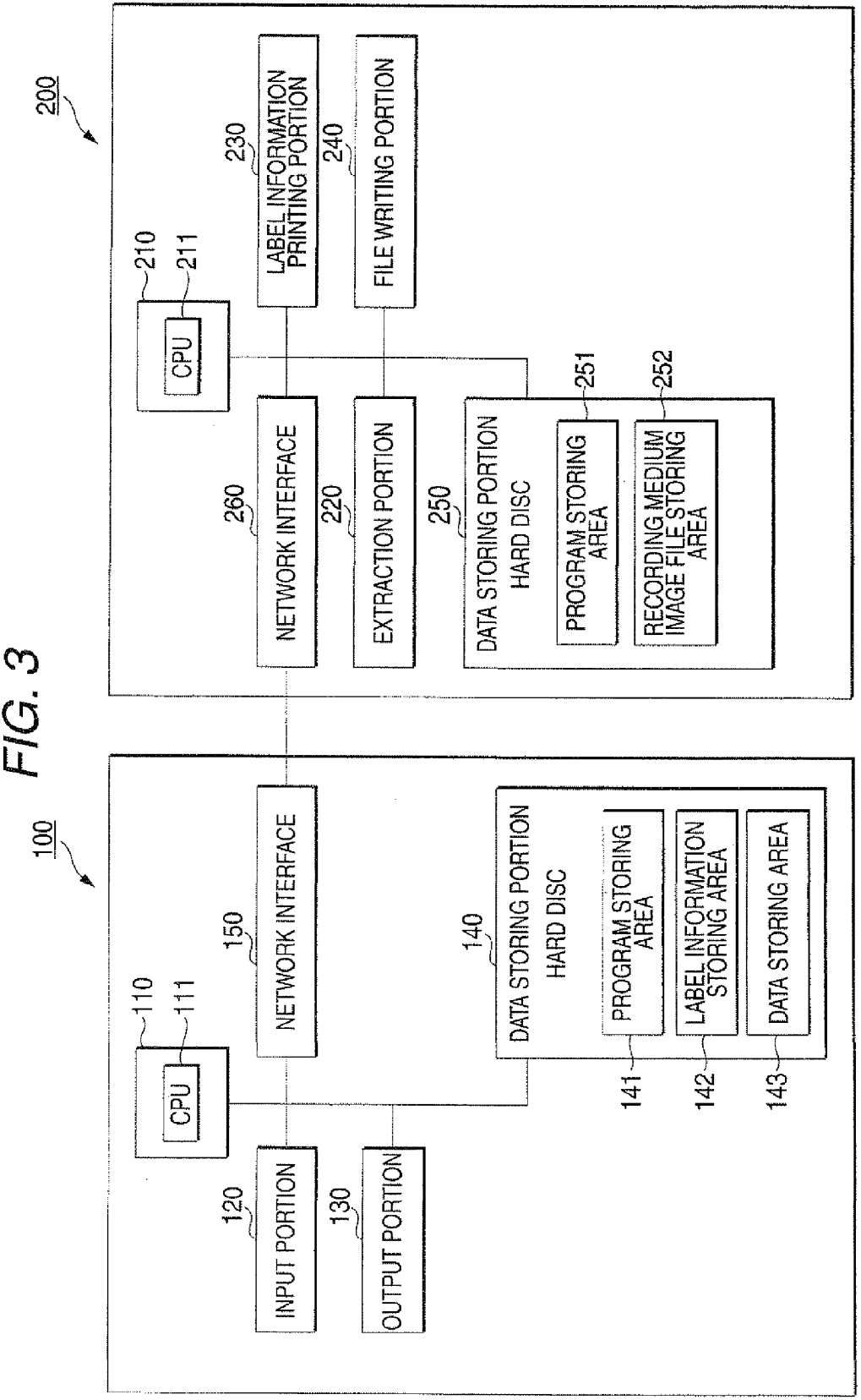
FIG. 3 is a diagram showing configurations of a file forming device and a label printer which are used in Embodiment 1.

FIG. 3 is a diagram showing a configuration of a file forming device 100 and a label printer 200 according to the embodiment.

The file forming device 100 is schematically constituted by a control portion 110 and a data storing portion 140. The label printer 200 is schematically constituted by a control portion 210, an extraction portion 220, a label information printing portion 230, a file writing portion 240, and a data storing portion 250. The file forming device 100 and the label printer 200 include network interfaces (150 and 260), respectively, whereby the data can be transmitted from the file forming device 100 to the label printer 200.

The control portion 110 includes a CPU 111. The portions 110, 140 of the file forming device 100 are connected to the CPU 111 via a bus line. The portions 110, 140 are controlled by the CPU 111. A computer program for operating the CPU 111 is stored in a program storing area 141. The CPU 111 reads out the program and performs a predetermined operation.

An input device such as a keyboard or a mouse is connected to an input portion 120, which is used to operate the file forming device 100.

An imaging device such as a display is connected to an input portion 130.

The data storing portion 140 includes a program storing area 141, a label information storing area 142, and a data storing area 143. The program storing area 141 stores a program required to control the CPU 111. The label information storing area 142 stores the label information. The label information is prepared by the use of the label preparing software. The data storing area 143 is an area storing the data to be written to the recording surface of the recording medium. The data storing area 143 stores the text data and the image data.

The control portion 210 of the label printer 200 includes a CPU 211, and the portions 210, 220 of the label printer 200 are controlled via the bus line. The computer program for operating the CPU 211 is stored in a program storing area 251 of a data storing portion 250. The CPU 211 reads out the program and performs a predetermined operation.

The extraction portion 220 extracts the label information from the recording medium image file. In a method of extracting the label information, a specific file name is designated from the file stored in the recording information of the recording medium image file so as to extract the label information.

The label information printing portion 230 prints the extracted label information on the label surface of the recording medium. A printing method employs an ink-jet method in view of a small impact on the recording medium and a printing speed.

The file writing portion 240 reads out the recording medium image file stored in the data storing portion 250 and writes the readout recording medium image file to the recording surface of the recording medium. The file writing portion 240 separates the label information from the recording information stored in the recording medium image file so as to write the recording medium image file, which the label information is separated from, to the recording surface of the recording medium.

The data storing portion 250 includes a program storing area 251 and a recording medium image file storing area 252. The program storing area 251 is an area storing a program required to control the CPU 211. The recording medium image file storing area 252 is an area storing the recording medium image file transmitted from the file forming device 100.

Hereinafter, operations of the file forming device 100 and the label printer 200 will be described.

Figure 4:
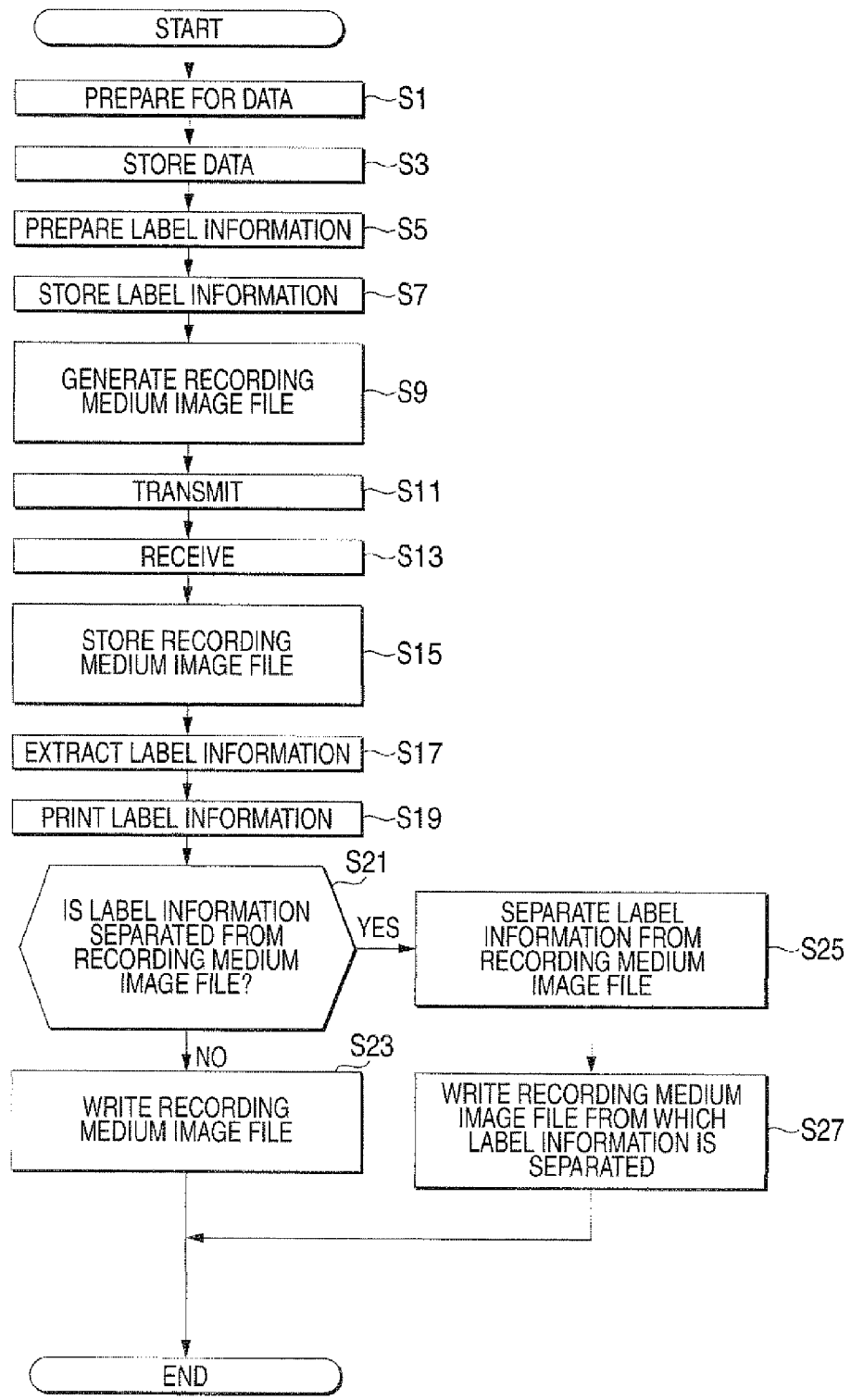
FIG. 4 is a flowchart showing a label printing operation.

FIG. 4 is a flowchart showing a label printing operation from the recording medium image file.

The data to be written to the recording surface of the recording medium is prepared by the operation of the input portion 120 (step 1), and the data is stored in the data storing area 143 (step 3). Next, the label information is prepared by executing the label preparing software (step 5), and the label information is stored in the label information storing area 142 (step 7). By executing the recording medium writing software, the data is read out from the data storing area 143, and the label information is read out from the label information storing area 142, and the readout data and label information are stored in the recording information area of the recording medium image file so as to prepare the recording medium image file. The prepared recording medium image file is transmitted to the label printer 200 using the network (step 11).

After the label printer 200 receives the recording medium image file (step 13), the label printer 200 stores the recording medium image file in the recording medium image file storing area 252 of the data storing portion 250 (step 15). Next, the extraction portion 220 designates a specific file name from the recording medium image file so as to extract the label information (step 17). The extracted label information is transmitted to the label information printing portion 230, which prints the label information on the label surface of the recording medium (step 19). The file writing portion 240 reads out the recording medium image file from the recording medium image file storing area 252. When the label information is required for the data to be written to the recording medium (step 21; N), the recording medium image file is just written to the recording surface of the recording medium (step 23). When the label information is not required (step 21; Y), the label information is separated from the recording medium image file (step 25), and the recording medium image file, which the label information is separated from, is written to the recording surface of the recording medium (step 27).

As described above, the user can perform label printing and writing of the recording medium image file in a simple manner only by performing the writing operation of the file forming device by the use of the label printer according to the embodiment.

Embodiment 2

Figure 5:
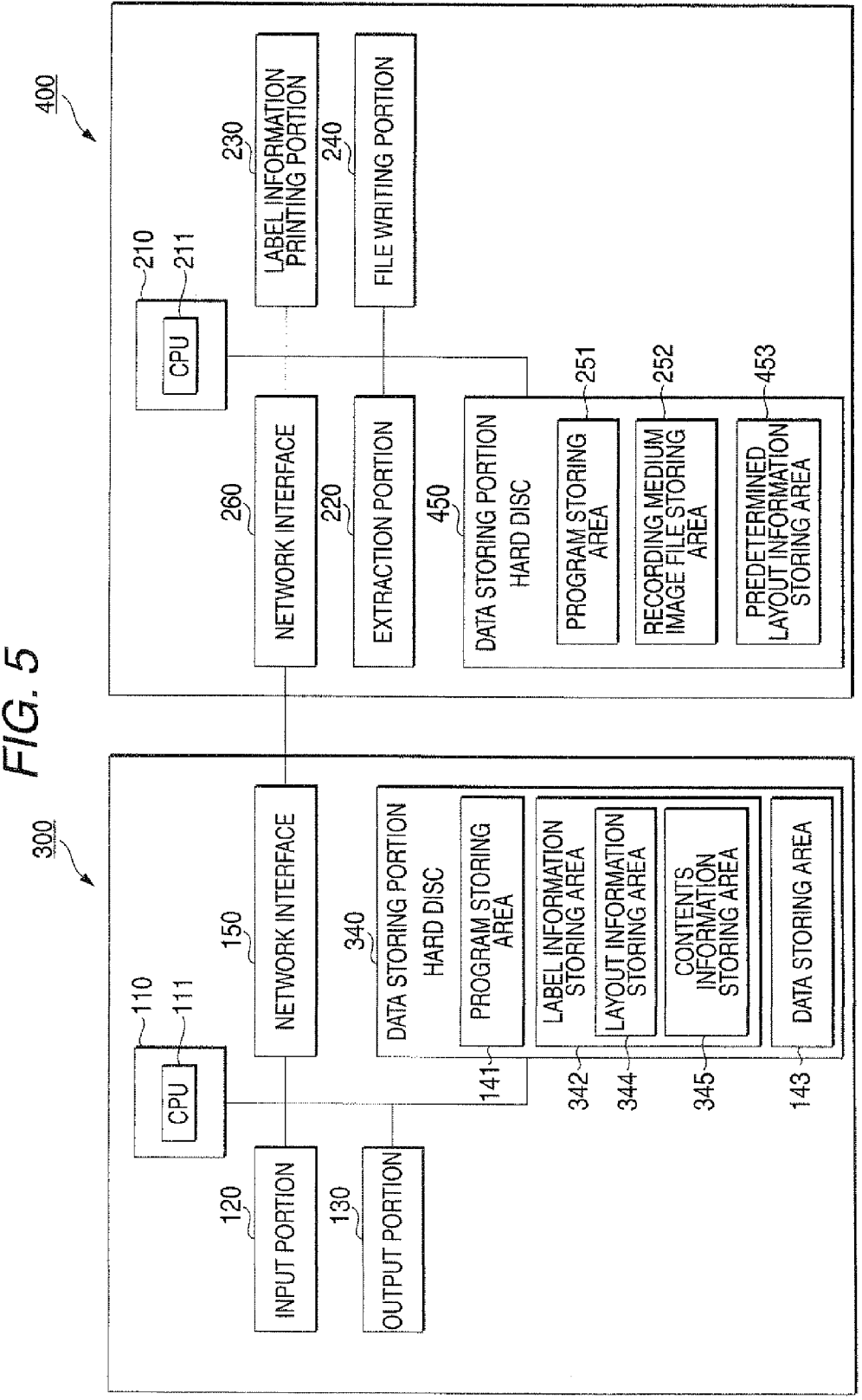
FIG. 5 is a diagram showing configurations of a file forming device and a label printer which are used in Embodiment 2.

FIG. 5 is a diagram showing configurations of a file forming device 300 and a label printer 400 according to another embodiment. The same elements as described in Embodiment 1 are denoted by the same reference numerals, and description thereof is thus omitted.

A label information storing area 342 of the file forming device 300 includes a layout information storing area 344 and a contents information storing area 345. According to this configuration, the configuration of the label information can be prepared to include the layout information and the contents information.

A data storing portion 450 of the label printer 400 includes a program storing area 251, the recording medium image file storing area 252 and a predetermined layout information storing area 453.

Hereinafter, operations of the file forming device 300 and the label printer 400 will be described.

Figure 6:
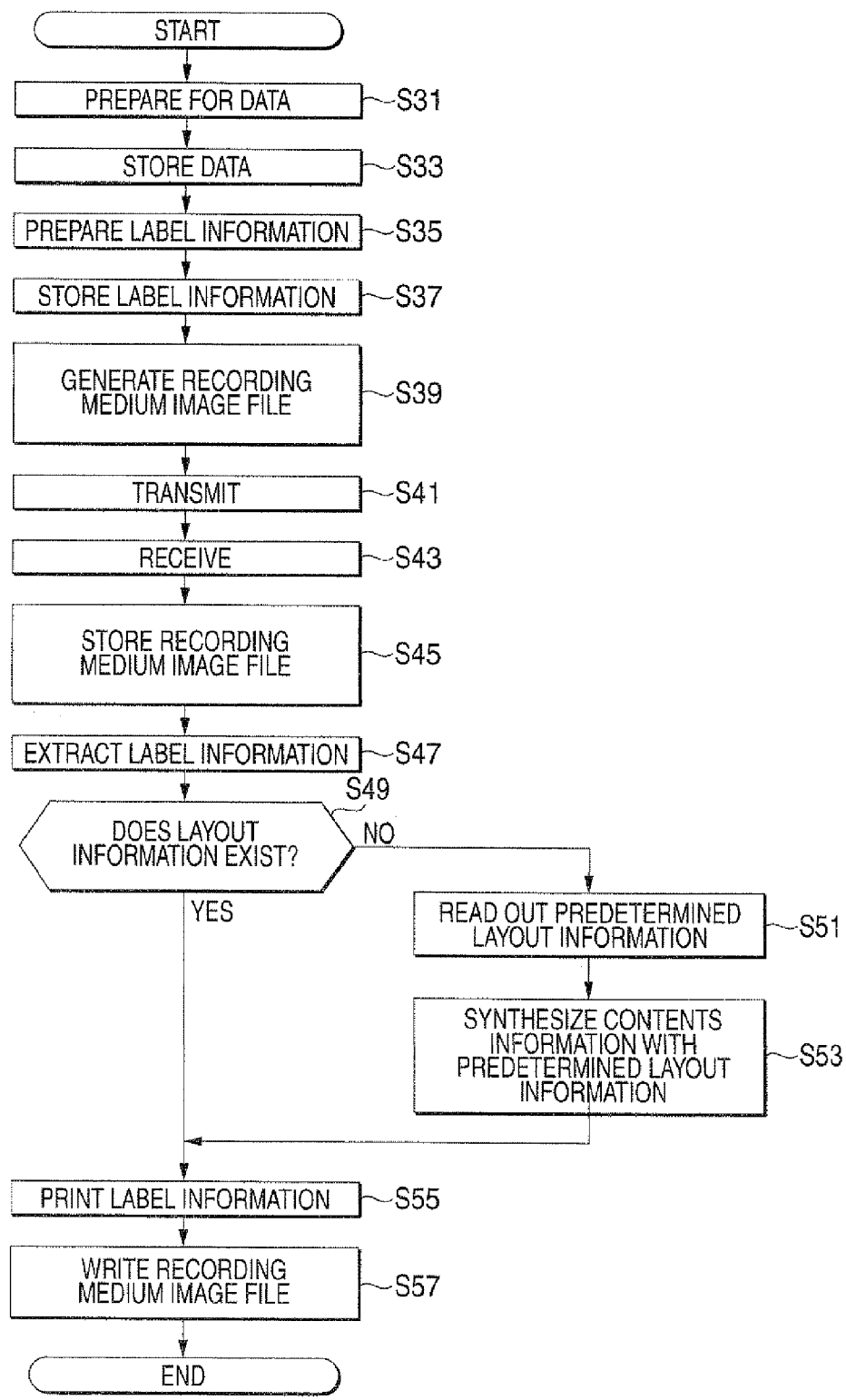
FIG. 6 is a flowchart showing a label printing operation.

FIG. 6 is a flowchart showing the label printing operation of from the recording medium image file.

The data to be written to the recording surface of the recording medium is prepared by the operation of the input portion 120 (step 31), and the data is stored in the data storing area 143 (step 33). Next, the label information is prepared to include the layout information and the contents information by executing the label preparing software (step 35). The layout information and the contents information are stored in the layout information storing area 344 and the contents information storing area 345, respectively (step 37). By executing the recording medium writing software, the data is read out from the data storing area 143, the layout information and the contents information are read out from the layout information storing area 344 and the contents information storing area 345, and the readout data, and the layout information and the contents information are stored in the recording information area of the recording medium image file so as to prepare the recording medium image file (step 39). When the layout information does not exist, only the contents information is read out so as to prepare the recording medium image file. The prepared recording medium image file is transmitted to the label printer 400 using the network (step 41).

After the label printer 400 receives the recording medium image file (step 43), the recording medium image file is stored in the recording medium image file storing area 252 (step 45). Next, the extraction portion 220 designates a specific file name from the recording medium image file so as to extract the label information (step 47). When the extracted label information includes the layout information (step 49; Y), the label information is prepared by synthesizing the contents information with a coordinate designated by the layout information, and the label information is printed (step 55). Meanwhile, when the extracted label information does not include the layout information (step 49; N), the predetermined layout information is read from the predetermined layout information storing area 453 (step 51), and the contents information is synthesized with the predetermined layout information so as to prepare the label information (step 53). The prepared label information is printed (step 55). After label printing is terminated, the file writing portion 240 reads out the recording medium image file from the recording medium image file storing area 252 and writes the readout recording medium image file to the recording surface of the recording medium (step 57).

As described above, even when the label information does not include the layout information, the predetermined layout information is read out, and the contents information is synthesized with the read out layout information so as to prepare the label information, by using the label printer according to the embodiment.

When a stylized data processing operation is performed (when electronic chart data is treated), it is possible to perform label printing in a simple manner only by changing the image information (image information concerning a patient's face, etc.) or text information (a patient's name, a preparation date, etc.) on the basis of the predetermined layout information with the label printer according to the embodiment.

The recording medium preparing information including the recording date and time, the JOB number, and a serial number may be used as the contents information used in the embodiment.

Embodiment 3

Figure 7:
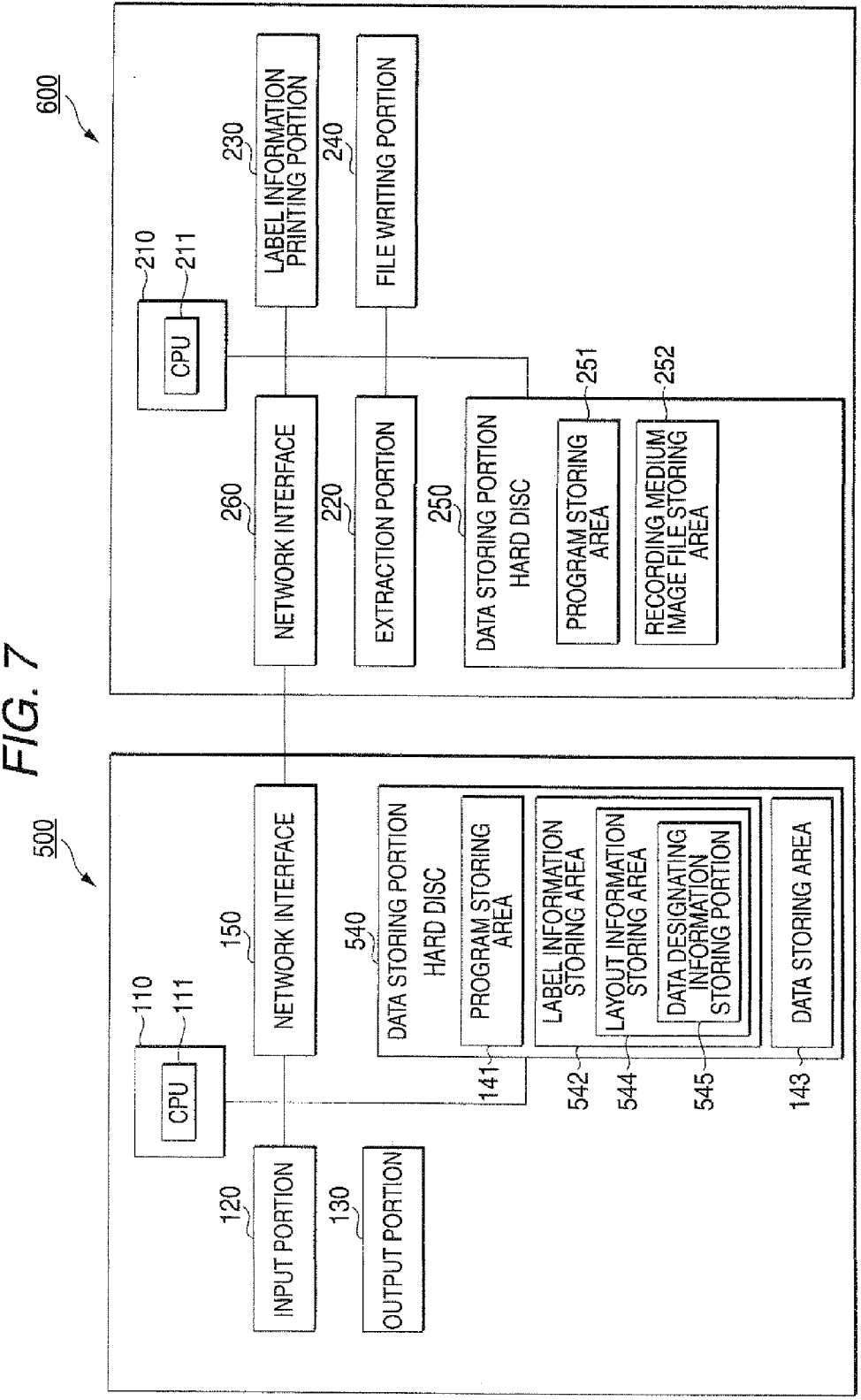
FIG. 7 is a diagram showing configurations of a file forming device and a label printer which are used in Embodiment 3.

FIG. 7 is a diagram showing configurations of a file forming device 500 and a label printer 600 according to another embodiment. The same elements as described in Embodiment 1 are denoted by the same reference numerals, and description thereof is thus omitted.

A label information storing area 542 of the file forming device 500 includes a layout information storing area 544. The layout information storing area 544 includes a data designating information storing area S45. The data designating information storing area 545 is an area (for example, information concerning a link destination) in which information designating specific data (contents data such as text data or image data) is included in a data folder of the recording medium image file. The information designating the specific data is used as data designating information.

Hereinafter, operations of the file forming device 500 and the label printer 600 will be described.

Figure 8:
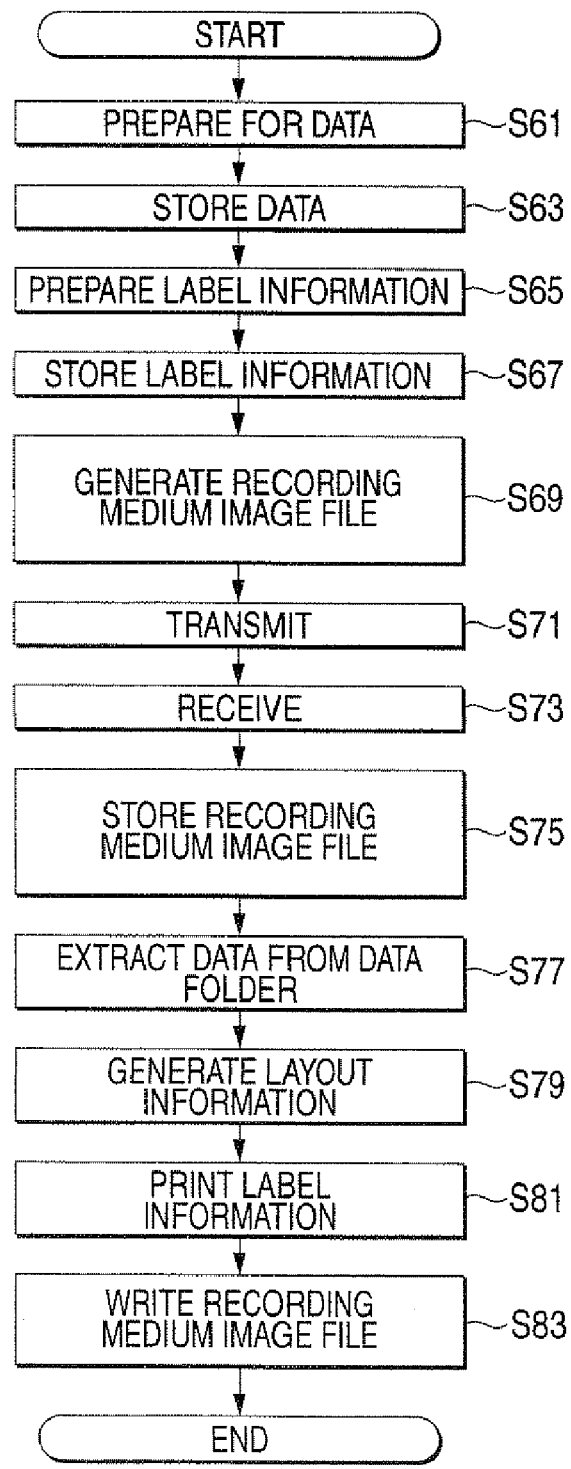
FIG. 8 is a flowchart showing a label printing operation.

FIG. 8 is a flowchart showing the operation of performing label printing from the recording medium image file.

The data to be written to the recording surface of the recording medium is prepared by the operation of the input portion 120 (step 61), and the data is stored in the data storing area 143 (step 63). Next, the layout information including the data designating information is prepared by executing the label preparing software (step 65) and the layout information is stored in the layout information storing area 544 (step 67). By executing the recording medium writing software, the data is read out from the data storing area 143, and the layout information is read out from the layout information storing area 544 of the label information storing area 542, and the data and the layout information are stored in the recording information area of the recording medium image file so as to prepare the recording medium image file (step 69). The prepared recording medium image file is transmitted to the label printer 600 using the network (step 71).

After the label printer 200 receives the recording medium image file (step 73), the label printer 200 stores the recording medium image file in the recording medium image file storing area 252 (step 75). Next, the extraction portion 220 extracts the data designating information from the recording medium image file and extracts the data (contents data) on the data designating information (step 77). The data and the layout information are synthesized, and thus, the label information is prepared (step 79). The prepared label information is transmitted to the label information printing portion 230, which prints the label information in the recording medium (step 81). Meanwhile, the file writing portion 240 reads out the recording medium image file from the recording medium image file storing area 252 so as to write the read out recording medium image file to the recording surface of the recording medium (step 83).

As described above, even when the recording medium image file transmitted to the label printer is prepared to include the data and the layout information including the data designating information, it is possible to perform label printing. According to this configuration, it is not necessary to prepare for the contents information at the time of preparing the label information. Accordingly, the user can perform label printing in a simple manner.

Embodiment 4

Figure 9:
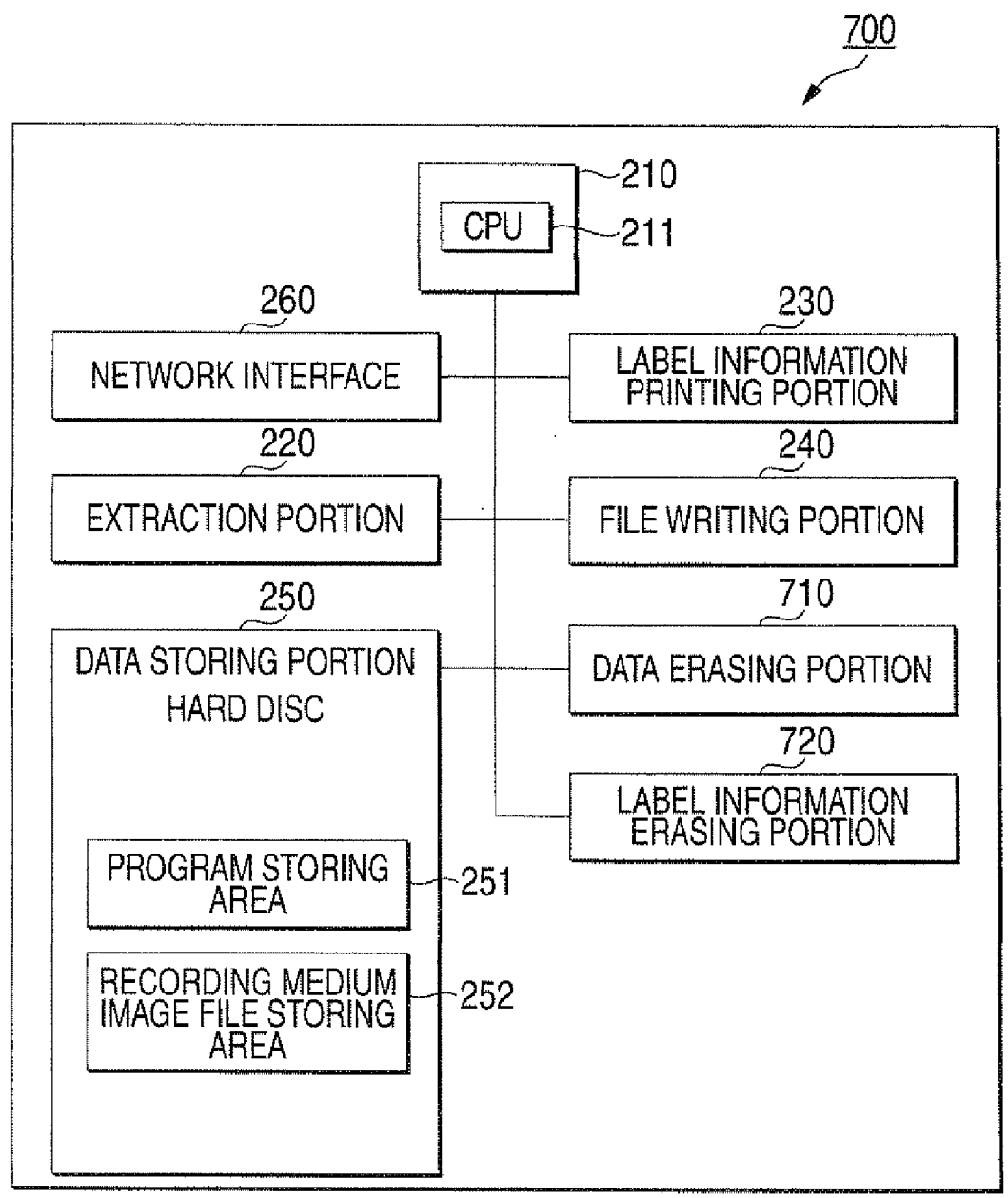
FIG. 9 is a diagram showing a configuration of a label printer used in Embodiment 4.

FIG. 9 is a diagram showing a configuration of a label printer 700 according to another embodiment. The same elements as described in Embodiment 1 are denoted by the same reference numerals, and description thereof is thus omitted.

The label printer 700 includes a data erasing portion 710 and a label information erasing portion 720.

The data erasing portion 710 erases the data written to the recording surface of the recording medium.

The label information erasing portion 720 erases the label information by coating the label surface of the recording medium with white paint.

Hereinafter, an operation of the label printer 700 will be described.

Figure 10:
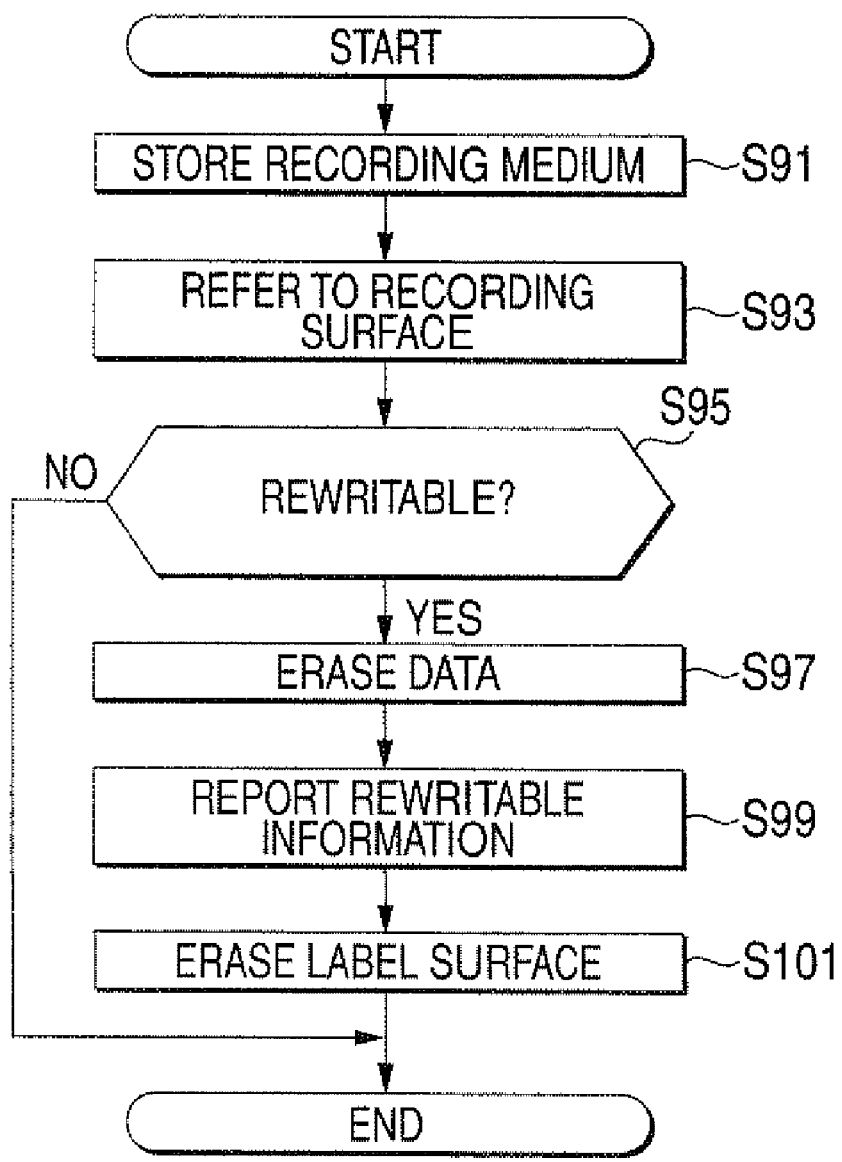
FIG. 10 is a flowchart showing a label information erasing operation.

FIG. 10 is a flowchart showing an operation of erasing the label surface when a rewritable recording medium is stored in the label printer 700.

When the recording medium is stored in the label printer 700 (step 91), the data erasing portion 710 judges whether the recording medium is the rewritable recording medium (step 95) with reference to the recording surface of the recording medium (step 93). When the recording medium is rewritable (step 95; Y), the data erasing portion 710 erases the data of the recording medium (step 97). When the recording medium is not rewritable (step 95; N), the operation of the label printer 700 is ended. The data erasing portion 710 reports the information indicating that the recording medium is the rewritable recording medium to the label information erasing portion 720 (step 99), and the label information erasing portion 720 receiving the report erases the label surface of the recording medium (step 101).

According to this configuration, the recording medium is in a state in which new data can be written and a new label can be printed.

Other operations are the same as those of the example shown in FIG. 3.

As described above, when the label printer according to the embodiment is used, the rewritable recording medium is in the state in which the new data can be written and the new label can be printed by erasing the data and the label information of the rewritable recording medium.

The invention is not limited to the embodiments which have been described above. The invention may be modified in various forms by those skilled in the art without departing from the scope of the appended claims.

The invention claimed is:

1. A label printer comprising:
an extraction unit configured to extract label information from a recording medium image file which stores data to be written to a recording surface of a recording medium and the label information to be printed on a label surface of the recording medium;
a label information printing unit configured to print the extracted label information on the label surface of the recording medium;
a file writing unit configured to write the recording medium image file to the recording surface of the recording medium; and
a layout information storing unit storing predetermined layout information,
wherein it is determined whether the extracted label information includes layout information and contents information,
wherein when the extracted label information includes the layout information, the contents information is incorporated into the layout information, and the label information printing unit prints the contents information on the label surface in a layout indicated by the layout information, and
wherein when the extracted label information does not include the layout information, the contents information is incorporated into the predetermined layout information stored in the layout information storing unit, and the label information printing unit prints the contents information on the label surface in a layout indicated by the predetermined layout information.

2. The label printer according to claim 1, wherein the contents information includes a recording date and time, a JOB number, and recording medium preparing information of a disc ID.

3. The label printer according to claim 1, wherein the label information includes the layout information and data designating information, and
wherein the label printer extracts specific data from the data on the basis of the data designating information and incorporates the specific data into the layout information to print the resultant information.

4. The label printer according to claim 1, further comprising:
a data erasing unit configured to erase data from the recording medium when the recording medium is rewritable with reference to the recording surface of the recording medium; and
a label information erasing unit configured to receive a report, which indicates that the recording medium is rewritable, from the data erasing unit, and to erase the label information from the label surface of the recording medium.

5. The label printer according to claim 1,
wherein the file writing unit separates the label information from the recording medium image file, and the file writing unit writes the recording medium image file, from which the label information is separated, to the recording surface of the recording medium.

6. A method of processing label information using a label printer, the method comprising:
extracting the label information from a recording medium image file which stores data to be written to a recording surface of a recording medium and the label information to be printed on a label surface of the recording medium; and
in response to only an instruction for writing data from a user, printing the extracted label information on the label surface of the recording medium, and writing the recording medium image file to the recording surface of the recording medium;
determining whether the extracted label information includes layout information and contents information;
when the extracted label information includes the layout information, incorporating the contents information into the layout information, and printing the contents information on the label surface in a layout indicated by the layout information; and
when the extracted label information does not include the layout information, incorporating the contents information into predetermined layout information stored in a layout information storing unit provided in the label printer, and printing the contents information on the label surface in a layout indicated by the predetermined layout information.

* * * * *